US010252815B2

(12) United States Patent
Murugappan et al.

(10) Patent No.: US 10,252,815 B2
(45) Date of Patent: Apr. 9, 2019

(54) SYSTEM AND METHOD FOR MONITORING A COCKPIT OF AN AIRCRAFT

(71) Applicant: General Electric Company, Schenectady, NY (US)

(72) Inventors: Sundar Murugappan, San Ramon, CA (US); Alexander Kaber Carroll, Lopez Island, WA (US); Norman Leonard Ovens, Ada, MI (US); Sharon Ann Green, Clearwater, FL (US); Jennifer Ruth Cooper, Walnut Creek, CA (US); So Young Kim, Dublin, CA (US); Michael Eric Figard, Rockford, MI (US); Masaki Merritt Akiyama, Oakland, CA (US); Bernardo Pires, Pittsburgh, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/581,016

(22) Filed: Apr. 28, 2017

(65) Prior Publication Data
US 2018/0312272 A1    Nov. 1, 2018

(51) Int. Cl.
*G01M 17/00* (2006.01)
*B64D 45/00* (2006.01)
(Continued)

(52) U.S. Cl.
CPC .............. *B64D 45/00* (2013.01); *B64C 13/04* (2013.01); *B64D 43/00* (2013.01); *B64D 47/08* (2013.01);
(Continued)

(58) Field of Classification Search
CPC ............ B64D 45/00; B64D 2045/0085; B64C 13/04; G06K 9/00832; H04N 7/18
(Continued)

(56) References Cited

U.S. PATENT DOCUMENTS 5,283,643 A * 2/1994 Fujimoto ............... B64D 45/00
340/973
5,742,336 A * 4/1998 Lee ........................ B64D 47/00
348/143

(Continued)

FOREIGN PATENT DOCUMENTS

EP    1 419 964 A1    5/2004
EP    3 133 469 A1    2/2017
WO    03/023730 A1    3/2003

OTHER PUBLICATIONS

Hamza et al., "Video to information (V2I) system enabling old commercial cockpit instruments to participate in the advanced information retrieval and safety services", Digital Avionics Systems Conference, 2002. Proceedings. The 21st, vol. 2, pp. 12C4-1-12C4-10, Oct. 27-31, 2002.

(Continued)

*Primary Examiner* — Shardul D Patel
(74) *Attorney, Agent, or Firm* — GE Global Patent Operation; Nitin Joshi

(57) ABSTRACT

A method of monitoring a cockpit of an aircraft includes receiving, by one or more controllers, an image depicting an operator manipulated input device located within the cockpit. The method can include determining, by the one or more controllers, an observed state of the operator manipulated input device. In particular, the observed state can be based on the image. The method can include determining, by the one or more controllers, a sensed state of the operator manipulated input device. In particular, the sensed state can be based on data from a sensor. The method can include determining, by the one or more controllers, a mismatch between the observed and sensed states of the operator manipulated input device.

16 Claims, 11 Drawing Sheets

(51) Int. Cl.
*G06K 9/00* (2006.01)
*H04N 7/18* (2006.01)
*B64C 13/04* (2006.01)
*B64D 43/00* (2006.01)
*B64D 47/08* (2006.01)

(52) U.S. Cl.
CPC ........... *G06K 9/00832* (2013.01); *H04N 7/18* (2013.01); *B64D 2045/0085* (2013.01)

(58) Field of Classification Search
USPC .......... 701/30.5; 348/143, 160, 77; 340/945, 340/963, 971
See application file for complete search history.

(56) References Cited

U.S. PATENT DOCUMENTS

| | | | | |
|---|---|---|---|---|
| 6,721,640 | B2* | 4/2004 | Glenn | G07C 5/0891 340/945 |
| 7,183,946 | B2* | 2/2007 | Boudrieau | B64D 45/0015 244/189 |
| 8,886,372 | B2* | 11/2014 | Nikolic | G01C 23/005 340/665 |
| 9,546,002 | B1 | 1/2017 | Azcuenaga et al. | |
| 2001/0026216 | A1* | 10/2001 | Block | G01C 23/00 340/425.5 |
| 2002/0118210 | A1* | 8/2002 | Yuasa | H04N 1/6052 345/589 |
| 2003/0048202 | A1* | 3/2003 | Francois | G08B 13/1965 340/945 |
| 2007/0013693 | A1* | 1/2007 | Hedrick | G01C 23/005 345/419 |
| 2007/0236366 | A1* | 10/2007 | Gur | G06K 9/00 340/945 |
| 2010/0214411 | A1 | 8/2010 | Weinmann et al. | |
| 2012/0147133 | A1* | 6/2012 | Hadwiger | H04N 5/23238 348/36 |
| 2013/0107027 | A1* | 5/2013 | Muellhaeuser | H04N 7/18 348/77 |
| 2017/0242564 | A1* | 8/2017 | De Bossoreille | G06F 3/0488 |

OTHER PUBLICATIONS

Ranon et al., "Automatic camera control meets emergency simulations: An application to aviation safety", Computers & Graphics, vol. 48, pp. 23-34, May 2015.
Aircrew Labor In-Cockpit Automation System, Aurora Flight Sciences, http://www.aurora.aero/wp-content/uploads/2016/10/ALIAS-Brochure_X8.pdf.
Aurora Flight Sciences, http://www.aurora.aero/alias/.
Extended European Search Report and Opinion issued in connection with corresponding EP Application No. 18169459.7 dated Oct. 18, 2018.

* cited by examiner

SYSTEM AND METHOD FOR MONITORING A COCKPIT OF AN AIRCRAFT

FIELD

The present subject matter relates generally to a system and method for monitoring a cockpit of an aircraft.

BACKGROUND

The cockpit of an aircraft generally includes a flight deck having various instruments and flight displays, which can display a wide range of aircraft, flight, navigation, and other information used in the operation and control of the aircraft. The cockpit may also include an operator manipulated input device, which can be used by a pilot to control operation of the aircraft. During operation of the aircraft, an instrument or flight display can malfunction and, as a result, present incorrect information. Alternatively or additionally, a sensor operable to detect movement of the operator manipulated input device can malfunction and, as a result, limit ability of the pilot to control the aircraft via the operator manipulated input device.

BRIEF DESCRIPTION

Aspects and advantages of the present disclosure will be set forth in part in the following description, or may be obvious from the description, or may be learned through practice of the present disclosure.

In one example embodiment, a method of monitoring a cockpit of an aircraft includes receiving, by one or more controllers, an image depicting an operator manipulated input device located within the cockpit. The method can also include determining, by the one or more controllers, an observed state of the operator manipulated input device. In particular, the observed state can be based on the image. The method can include determining, by the one or more controllers, a sensed state of the operator manipulated input device. In particular, the sensed state can be based on data from a sensor. The method can also include determining, by the one or more controllers, a mismatch between the observed and sensed states of the operator manipulated input device.

In another example embodiment, a method of monitoring a cockpit of an aircraft includes receiving, by one or more controllers, an image depicting an instrument located within the cockpit. The method can also include determining, by the one or more controllers, an observed state of the instrument. In particular, the observed state can be based on the image. The method can include determining, by the one or more controllers, a sensed state of the instrument. In particular, the sensed state can be based on data from a sensor. The method can also include determining, by the one or more controllers, a mismatch between the observed and sensed states of the instrument.

In yet another example embodiment, a system for monitoring a cockpit of an aircraft includes a camera. In particular, the camera can be positioned within the cockpit. The system can also include a flight deck disposed within the cockpit. More specifically, the flight deck can include a flight display. In addition, the system can include a controller in communication with the camera. Further, the controller can be configured to receive an image from the camera. In particular, the image can depict the flight display. The controller can be further configured to determine an observed state of the flight display based on the image. In addition, the controller can be configured to determine a sensed state of the flight display based on data from a sensor. Further, controller can be configured to determine a mismatch between the observed and sensed states of the flight display.

These and other features, aspects and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended Figs., in which.

DETAILED DESCRIPTION

Figure 1:
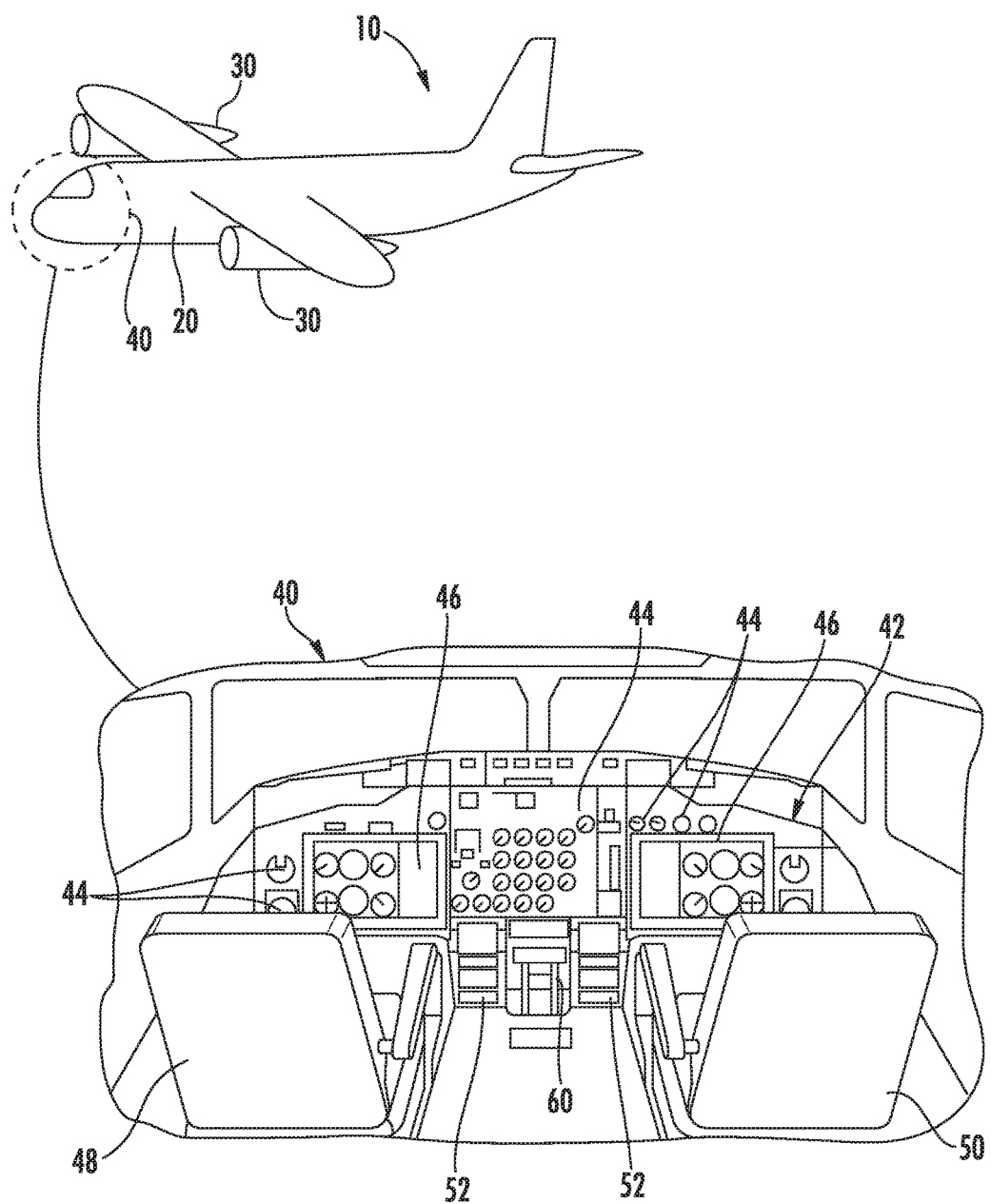
FIG. 1 illustrates an aircraft according to example embodiments of the present disclosure.

Reference will now be made in detail to present embodiments of the present disclosure, one or more examples of which are illustrated in the accompanying drawings. The detailed description uses numerical and letter designations to refer to features in the drawings.

As used herein, the terms "first" and "second" can be used interchangeably to distinguish one component from another and are not intended to signify location or importance of the individual components. The singular forms "a", "an", and "the" include plural references unless the context clearly dictates otherwise.

Example aspects of the present disclosure are directed to systems and method for monitoring a cockpit of an aircraft.

Specifically, in accordance with examples of the present disclosure, the cockpit includes a flight deck having instruments and flight displays that present information obtained, at least in part, from a flight control system of the aircraft. The cockpit can also include an operator manipulated input device that allows a flight crew member to control operation of the aircraft. Further, the aircraft can include a camera positioned within the cockpit, and the camera can be trained on at least one of the instruments, flight displays, or operator manipulated input device. A controller in communication with the camera can receive an image depicting at least one of the instruments, flight displays, and operator manipulated input device. As will be discussed below in more detail, the controller can be configured to determine an observed state of the instruments, flight displays, and operator manipulated input device based, at least in part, on the image.

In an example embodiment, the controller implements state detection logic to determine the observed state of the operator manipulated input device. More specifically, a pattern can be affixed to the operator manipulated input device, and the controller can implement the state detection logic to determine an observed position of the operator manipulated input device. Accordingly, the observed state of the operator manipulated input device can correspond to the observed position.

The controller can be further configured to communicate with the flight control system. In particular, the controller can receive flight control information indicating a sensed state of the instruments, flight displays, and operator manipulated input device. As will be discussed below in more detail, the controller can be configured to determine a mismatch between the observed and sensed states.

In an example embodiment, the observed state of an operator manipulated input device can indicate the operator manipulated input device is in a first position. Conversely, the sensed state can indicate the operator manipulated input device is in a second position that is different than the first position. As such, the controller can determine a mismatch exists between the observed and sensed states of the operator manipulated input device. This example embodiment illustrates the benefit of using image data from the camera in conjunction with the flight control data to monitor the cockpit of the aircraft. As will be discussed below in more detail, the controller can be further configured to generate a notification indicating the mismatch.

In an example embodiment, the notification is communicated within the cockpit of the aircraft. More specifically, the notification can include an audible or visual notification that apprises a flight crew member of the mismatch between the observed and sensed states of the instruments, flight displays, and/or operator manipulated input device.

With reference now to the FIGS., example embodiments of the present disclosure will be discussed in further detail. FIG. 1 depicts an aircraft 10 having, a fuselage 20, one or more engine(s) 30, and a cockpit 40. As shown, the cockpit 40 can include a flight deck 42 having various instruments 44 and flight displays 46. It should be appreciated that instruments 44 can include, without limitation, a dial, gauge, or any other suitable analog device.

A first user (e.g., a pilot) may be present in a seat 48 and a second user (e.g., a co-pilot) may be present in a seat 50. The flight deck 42 may be located in front of the pilot and co-pilot and may provide the flight crew (e.g., pilot and co-pilot) with information to aid in operating the aircraft 10. The flight displays 46 may include primary flight displays (PFDs), multi-function displays (MFDs), or both. During operation of the aircraft 10, both the instruments 44 and flight displays 46 can display a wide range of aircraft, flight, navigation, and other information used in the operation and control of the aircraft 10.

The instruments 44 and flight displays 46 may be laid out in any manner including having fewer or more instruments or displays. Further, the flight displays 46 need not be coplanar and need not be the same size. A touch screen display or touch screen surface (not shown) may be included in the flight display 46 and may be used by one or more flight crew members, including the pilot and co-pilot, to interact with the aircraft 10. The touch screen surface may take any suitable form including that of a liquid crystal display (LCD) and may use various physical or electrical attributes to sense inputs from the flight crew. It is contemplated that the flight displays 46 can be dynamic and that one or more cursor control devices (not shown) and/or one or more multifunction keyboards 52 may be included in the cockpit 40 and may be used by one or more flight crew members to interact with systems of the aircraft 10. In this manner, the flight deck 42 may be considered a user interface between the flight crew and the aircraft 10.

Figure 2:
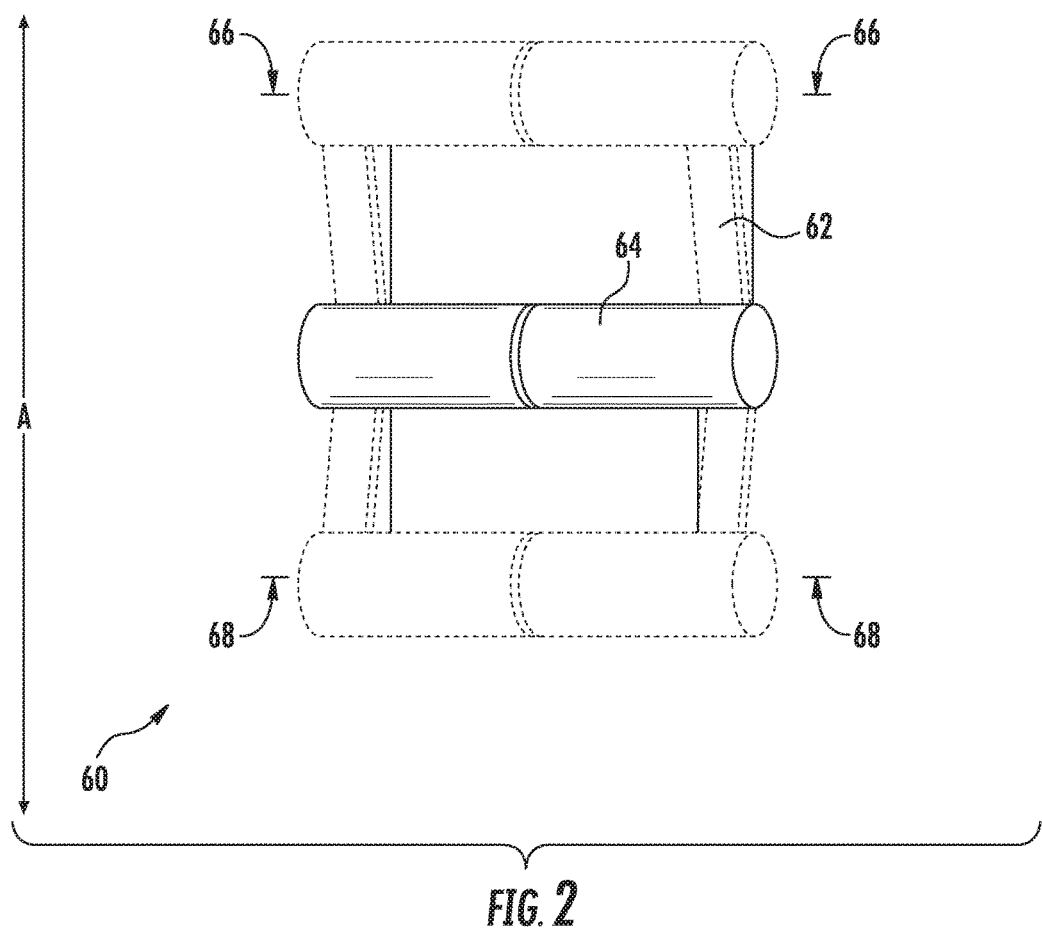
FIG. 2 illustrates an operator manipulated input device according to example embodiments of the present disclosure.

Additionally, the cockpit 40 can include an operator manipulated input device 60 that allow members of the flight crew to control operation of the aircraft 10. In one example embodiment, the operator manipulated input device 60 can be a throttle input device (FIG. 2) operable to control the engine power of the gas turbine engine 30 (FIG. 1). The throttle input device can define an axial direction A. Further, the throttle input device can include a lever 62 (FIG. 2) having a handle 64 (FIG. 2). As shown, the lever 62 is movable between a first position 66 and a second position 68 along the axial direction A. Accordingly, a flight crew member can move the lever between the first and second positions 66, 68 to control the engine power of the gas turbine engine 30.

Figure 3:
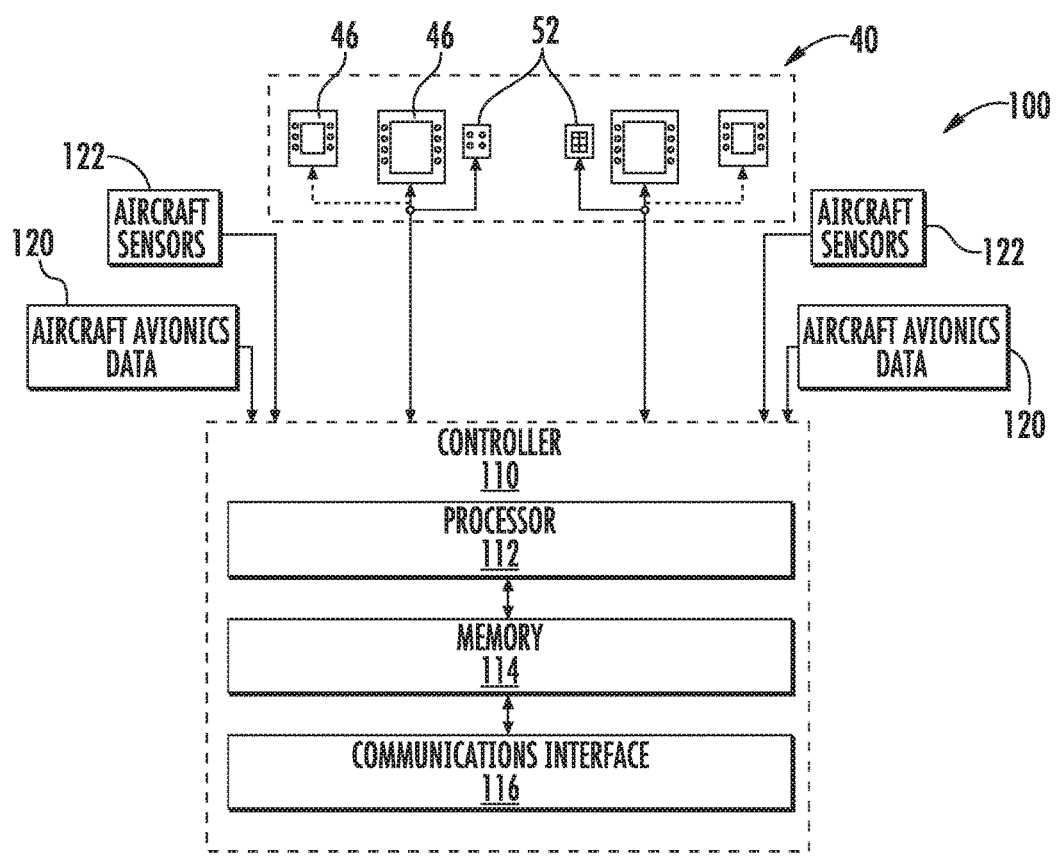
FIG. 3 illustrates a flight control system according to example embodiments of the present disclosure.

Referring now to FIG. 3, the aircraft 10 can include a flight control system 100 comprising one or more controller(s) 110. As shown, the controller(s) 110 can correspond to any suitable processor-based device, including one or more computing devices. For instance, the controller(s) 110 can include a processor 112 and associated memory 114 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC),a Field Programmable Gate Array (FPGA), and other programmable circuits. Additionally, the memory 114 can generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD) and/or other suitable memory elements or combinations thereof.

Additionally, the controller 110 can include a communications interface module 116. The communications interface module 116 can include associated electronic circuitry that is used to send and receive data. In one example embodiment, the controller 110 can be in communication with at least one of an avionics system 120 and a sensor system 122. Further, the controller 110 can be in communication with the flight displays 46. As such, the controller 110 can control information presented on the flight displays 46. More specifically, the controller 110 can update the information based, at least in part, on data received from the avionics system 120, the sensor system 122, or both. Accordingly, information presented on the instruments 44 and flight displays 46 originates from data that the flight control system 100 receives from the avionics and sensor systems 120, 122.

Figure 4:
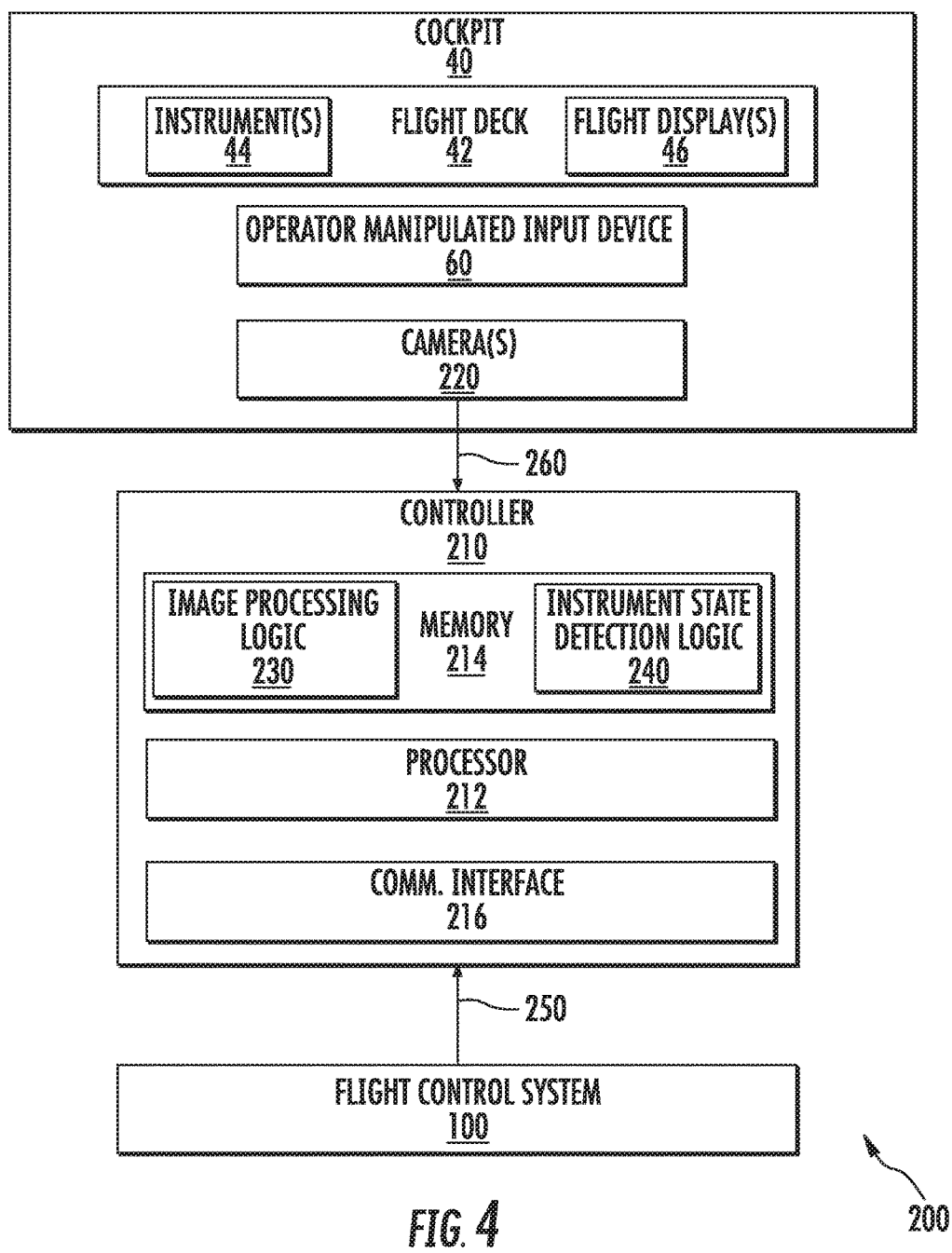
FIG. 4 illustrates a schematic diagram of a system for monitoring a cockpit of an aircraft according to example embodiments of the present disclosure.

Referring now to FIG. 4, an example embodiment of a system 200 for monitoring the cockpit 40 of the aircraft 10 is illustrated in accordance with aspects of the present disclosure. In general, the system 200 will be described with reference to the aircraft 10 and flight control system 100 described above with reference to FIGS. 1-3. However, in other embodiments, the system 200 can be implemented or used in association with any other suitable aircraft 10.

The system 200 can also include a controller 210. In general, the controller 210 can include one or more processor(s) 212 and associated memory 214 configured to perform a variety of computer-implemented functions (e.g., performing the methods, steps, calculations and the like disclosed herein). The controller 210 can also include a communications interface module 216. In example embodiments, the communications interface module 216 can include associated electronic circuitry that is used to send and receive data. As such, the communications interface module 216 of the controller 210 can be used to receive flight control data 250 from the flight control system 100. In one example embodiment, the controller 210 can receive flight control data 250 from the avionics system 120, the sensor system 122, or both. More specifically, the controller 210 can receive the data via a communications link between the controller 210 and the controller(s) 110 of the flight control system 100. In alternative embodiments, the controller 210 can be in direct communication with the avionics and sensor systems 120, 122. As will be discussed below in more detail, flight control data 250 can be used to determine a sensed state of the instruments 44, flight displays 46, and operator manipulated input device 60.

In one example embodiment, the controller 210 receives the flight control data 250 from the avionics system 120, the sensor system 122, or both. In particular, the sensor system 122 can include a sensor configured to measure altitude of the aircraft 10. Further, data from the sensor can be presented on at least one of the instruments 44 and flight displays 46.

The system 200 can include one or more camera(s) 220 positioned within the cockpit 40 of the aircraft 10 (FIG. 1). In one example embodiment, the camera(s) 220 can be trained on the flight deck 42, the operator manipulated input device 60, or both. Additionally, the camera(s) 210 can be communicatively coupled to the controller 210 via any suitable wired or wireless communications link. Accordingly, the controller 210 can receive an image 260 from the camera(s) 220. In one example embodiment, the image 260 can depict the instruments 44, the flight displays 46, or both. Alternatively or additionally, the image 260 can depict the operator manipulated input device 60.

The controller 210 can be configured to process the image 260 received from the camera(s) 220. For example, memory 214 of the controller 210 can include image processing logic 230 that, when executed, configures the controller 210 to process the image 260 received from the camera(s) 220.

Figure 5:
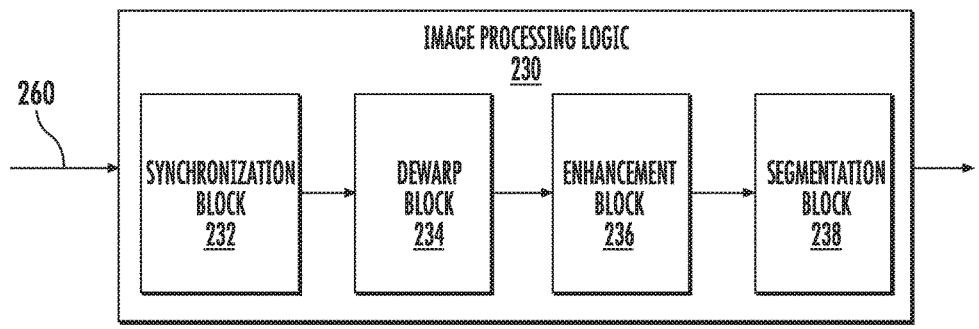
FIG. 5 illustrates image processing logic according to example embodiments of the present disclosure.

For example, FIG. 5 illustrates a schematic view of suitable image processing logic 230 that can be implemented by the controller 210 to process the image 260 received from the camera(s) 220. In particular, as shown, the image processing logic 230 can include a synchronization block 232 that ensures there is no time lag between the image 260 and the flight control data 250. For example, when executing the synchronization logic 232, the controller 210 can compare a first timestamp associated with the image 260 against a second timestamp associated with the flight control data 250. If the controller 210 determines the first timestamp is equal to the second timestamp, then no time lag exists between the image 260 and flight control data 250. Conversely, if the controller 210 determines the first timestamp is not equal to the second timestamp, then a time lag exists between the flight control data 250 and the image 260.

In some embodiments, the system 200 includes two or more cameras 220. As such, the controller 210, when executing the synchronization block 232, can compare a timestamp associated with one image against a timestamp associated with the other image(s). If the controller 210 determines the timestamps are equal to one another, then the controller 210 processes the images together. Conversely, if the controller 210 determines the timestamps are not equal to one another, then there is a time lag.

Additionally, the image processing logic 230 can include a dewarping block 234 that alters the image 260 received from the camera 220 to obtain a dewarped image. In one exemplary embodiment, the controller 210, when executing the dewarping block 234, alters the image to account for an optical aberration that is due, at least in part, to the lens (not shown) of the camera(s) 220. Accordingly, the dewarped image does not include the optical aberration.

The image processing logic 230 can also include an enhancement block 236 that enhances the dewarped image. More specifically, the controller 210, when executing the enhancement block 236, can adjust certain properties of the de-warped image to obtain an enhanced image. In one example embodiment, the controller 210, when executing the enhancement block 236, adjusts the contrast of the dewarped image to obtain the enhanced image.

The image processing logic 230 can also include a segmentation block 238 that partitions the enhanced image into one or more regions of interest. In one example embodiment, the controller 210, when executing the segmentation block 238, partitions the enhanced image into a first region of interest and a second region of interest. More specifically, the first region of interest can depict at least one of the instruments 44, and the second region of interest can depict one of the flight displays 46. Additionally or alternatively, the enhanced image can be partitioned into a third region of interest depicting the operator manipulated input device 60. As will be discussed below in more detail, memory 214 (FIG. 4) of the controller 210 can include state detection logic 240 (FIG. 4) that can be implemented by controller 210 to determine an observed state of at least one of the instruments 44, flight displays 46, and operator manipulated input device 60.

In one example embodiment, the controller 210, when executing the state detection logic 240, can compare the enhanced image against at least a first reference image and a second reference image, both of which depict the instrument 44. In particular, the controller 210 can compare the first region of interest within the enhanced image against a corresponding first region of interest within each of the first and second reference images.

Figure 6:
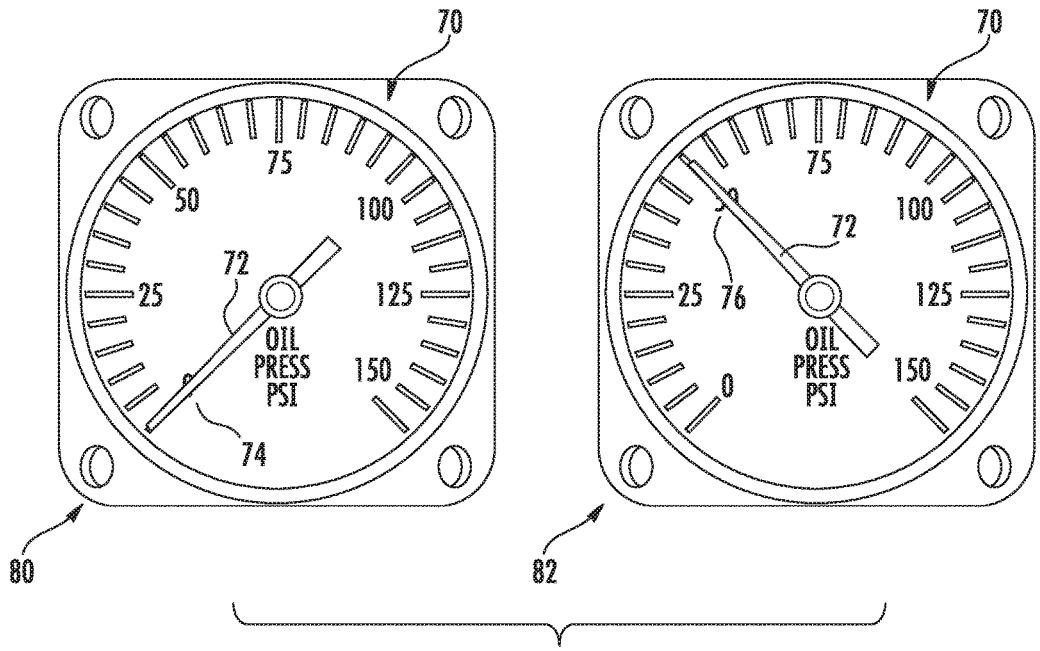
FIG. 6 illustrates an instrument according to example embodiments of the present disclosure.

Referring now to FIG. 6, the instrument 44 can be a gauge 70 having a needle 72, and a first reference image 80 can depict the needle 72 in a first position 74. Further, a second reference image 82 can depict the needle 72 in a second position 76 that is different than the first position 74. Accordingly, the controller 210, when executing the state detection logic 240, can determine an observed state (e.g., position of the needle) of the gauge 70 based, at least in part, on a comparison of the enhanced image against the first and second reference images 80, 82. More specifically, an observed position of the needle 72 in the enhanced image can be compared against the first and second position 74, 76 depicted in the first and second reference images 80 and 82, respectively. It should be appreciated that the controller 210 can be configured to compare the enhanced image against any suitable number of reference images.

In another example embodiment, the controller 210, when executing the state detection logic 240, can determine an observed state of one of the flight displays 46 depicted in the enhanced image. In particular, the flight display 46 can display a numerical value, and the controller 210 can determine the numerical value using any suitable pattern recognition algorithm. For example, the controller 210 can be configured to determine the numerical value using an optical character recognition (OCR) algorithm. Accordingly, the numerical value, as determined by the controller 210, can correspond to the observed state of the flight display 46.

In yet another example embodiment, the controller 210, when executing the state detection logic 240, can determine an observed state of the operator manipulated input device 60. In particular, the operator manipulated input device 60 can be a throttle input device (FIG. 3) operable to adjust engine power of the gas turbine engine 30 (FIG. 1). As will be discussed below in more detail, the controller 210 can implement any suitable method to determine the observed state of the operator manipulated input device 60.

Figure 7:
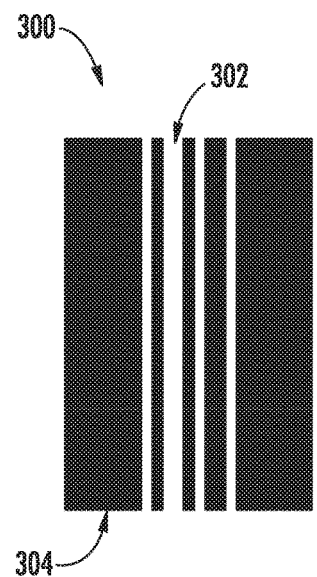
FIG. 7 illustrates a pattern according to example embodiments of the present disclosure.

Referring briefly to FIG. 7, a pattern 300 in accordance with example embodiments of the present disclosure is provided. In particular, the pattern 300 includes a plurality of white bands 302 and a plurality of black bands 304. In some implementations, the pattern 300 can be positioned on the handle 64 of the throttle input device. It should be appreciated, however, that the pattern 300 can be positioned at any suitable location on the throttle input device.

Figure 8:
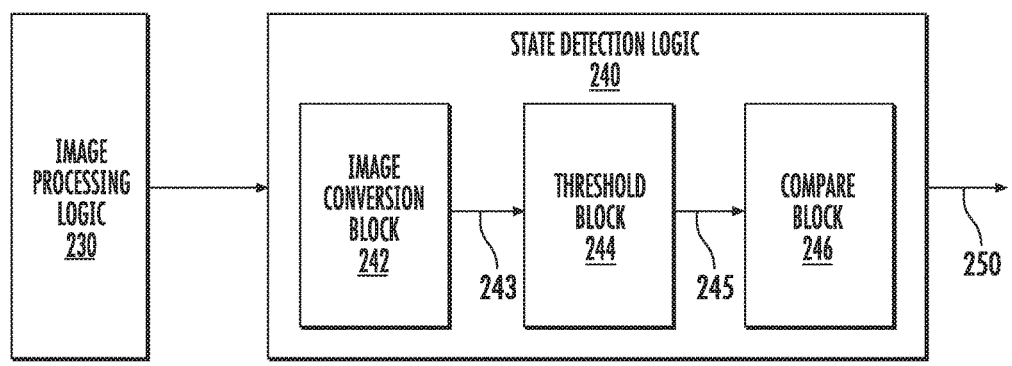
FIG. 8 illustrates state detection logic according to example embodiments of the present disclosure.

FIG. 8 illustrates a schematic view of suitable state detection logic 240 that can be implemented by the controller 210 to determine an observed state of the operator manipulated input device 60. In particular, the state detection logic 240 can include an image conversion block 242 that converts the enhanced image into a grayscale image 243. Further, the state detection logic 240 can include a threshold block 244 that applies an adaptive threshold to the grayscale image 243 in order to obtain a binary image 245 (e.g., black and white). In one example embodiment, the controller 240, when executing the threshold block 244, can apply the adaptive threshold to each pixel within the grayscale image 243. If a pixel has a gray-level that is less than or equal to the adaptive threshold, then the pixel is set to a background value (e.g., white). In contrast, if the pixel has a gray-level value that is greater than the adaptive threshold, then the pixel is set to a foreground value (e.g., black). In one example embodiment, the background value can be equal to two hundred and fifty-five (255), and the foreground value can be equal to zero (0). It should be appreciated that applying the adaptive threshold to each pixel within the grayscale image 243 produces the binary image 245. In addition, the state detection logic 240 can include a compare block 246 that compares the binary image 245 against at least a first reference image and a second reference image. As will be discussed below in more detail, the controller 210, when executing the compare block 246, can be configured to determine the observed state of the operator manipulated input device 60.

Figure 9:
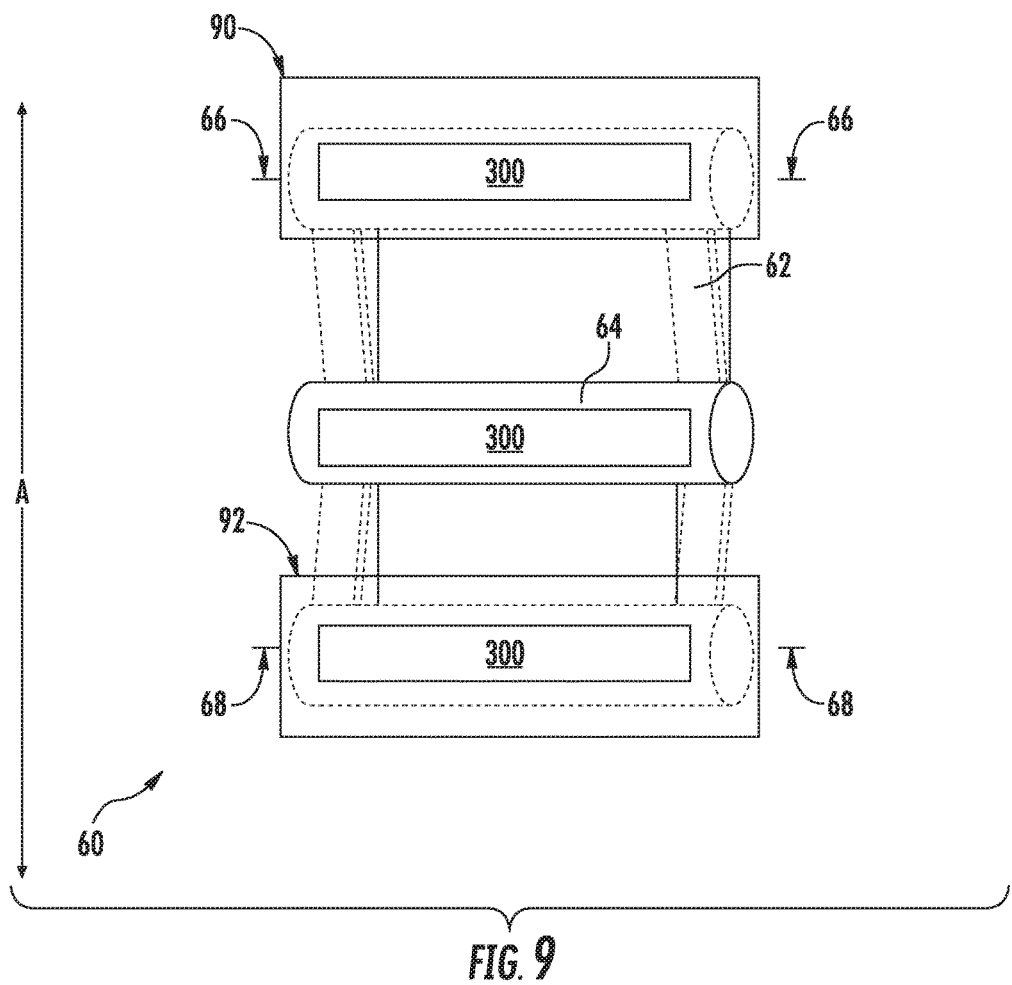
FIG. 9 illustrates the operator manipulated input device of FIG. 2 having a pattern according to example embodiments of the present disclosure.

Referring now to FIG. 9, the first reference image can depict the handle 64 of the operator manipulated input device 60 in the first position 66, and the second reference image can depict the handle 64 of the operator manipulated input device 60 in the second position 68. Within both the first and second reference images, it should be appreciated that the pattern 300 is identical. However, a size of the operator manipulated input device 60 is varied within the first and second reference images to account for variations in the size, as seen by the camera(s) 220, when the operator manipulated input device 60 is in various positions along the axial direction A (FIG. 3). In one example embodiment, the controller 210, when executing the compare block 246, determines an observed position of the operator manipulated input device 60 based, at least in part, on a cross-correlation between the binary image and each of the first and second reference images. If the cross-correlation between the binary image and the first reference image is greater than the cross-correlation between the binary image and the second reference image, then the observed position of the operator manipulated input device 60 corresponds to the first position 66. Conversely, if the cross-correlation between the binary image 245 and the second reference image is greater than the cross-correlation between the binary image 245 and the first reference image, then the observed state of the operator manipulated input device 60 corresponds to the second position 68. It should be appreciated, however, that the controller 210 can implement any suitable method to determine the observed state of the operator manipulated input device 60.

Figure 10:
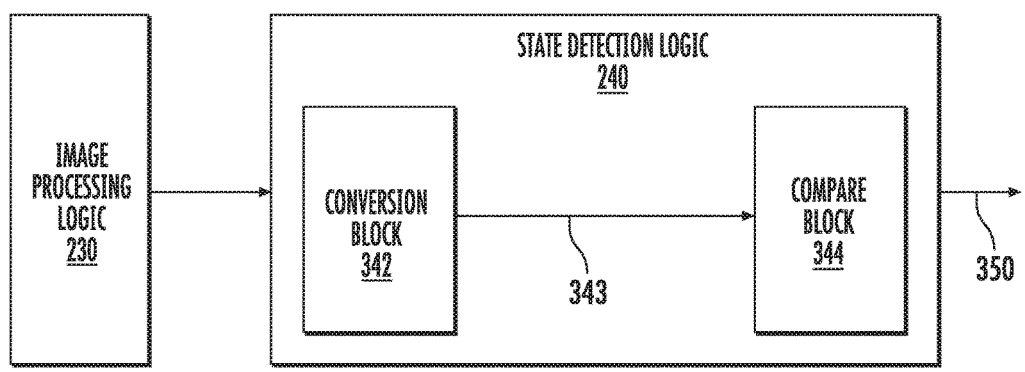
FIG. 10 illustrates state detection logic according to example embodiments of the present disclosure.

FIG. 10 illustrates a schematic view of suitable state detection logic 240 that can be implemented by the controller 210 to detect an observed state 350 of the operator manipulated input device 60. In particular, the state detection logic 240 can determine the observed state 350 based, at least in part, on the color of the operator manipulated input device 60. As shown, the state detection logic 240 can include a color space conversion block 342 that converts the enhanced image from an RGB (red, green, blue) color space to a Commission on Illumination (CIE) Lab color space. The CIE Lab color space includes an L-axis, a-axis, and b-axis. The L-axis includes values ranging from zero to one hundred. In example embodiments, a value of zero corresponds to the color black, and the value one hundred corresponds to the color white. The a-axis includes both positive and negative values. In example embodiments, a positive value on the a-axis indicates amounts of the color red, and a negative value on the a-axis indicates amounts of green. The b-axis also includes negative and positive values. In one example embodiment, a positive value on the b-axis indicates amounts of yellow, and a negative value on the b-axis indicates amounts of blue. As will be discussed below in more detail, the observed state 350 of the operator manipulated input device 60 can be determined based, at least in part, on both a-axis values and b-axis values from a CIE matrix [L, a, b] that is indicative of the converted image.

The state detection logic 240 also includes a compare block 344 that compares both a and b-axis values of the converted image against at least a first and second reference image depicting the operator manipulated input device 60. In particular, the first reference image can depict the operator manipulated input device 60 at a first position, and the second reference image can depict the operator manipulated input device 60 at a second position that is different from the first position.

Referring now to FIGS. 9 and 10, the first reference image can depict the operator manipulated input device 60 at the first position 66 along the axial direction A, and the second reference image can depict the operator manipulated input device 60 at the second position 68 along the axial direction A. Further, the first and second reference images can each define a region 90, 92 bounded by an $a_{min}$ value and an $a_{max}$ value along a first axis. Further, both regions 90, 92 can be bounded by a $b_{min}$ value and a $b_{max}$ value along another a second axis that is orthogonal to the first axis. It should be appreciated that the region 90, 92 defined within the first and second reference images indicates that the operator manipulated input device 60 is in either the first or second positions 66, 68.

Additionally, the controller 210, when executing the compare block 342, can compare both a-axis values of the converted image and b-axis values of the converted image against those a and b values within the region 90, 92 defined by the first and second reference images, respectively. If a pixel of the converted image is assigned an a-axis or b-axis value that is within the region 90 defined by the first reference image, then the controller 210 determines the pixel identifies the operator manipulated input device 60 as being located in the first position 66. Conversely, if the pixel of the converted image is assigned an a-axis or b-axis value that is not within the region 90 defined by the first reference image, then the controller 210 determines the pixel does not identify the operator manipulated input device 60 as being located in the first position 66. Further, if the region 90 defined by the first reference image encompasses more pixels of the converted image 343 than the region 92 defined by the second reference image, then the observed state 350 of the operator manipulated input device 60 corresponds to the first position 66. Alternatively, if the region 92 defined by the second reference image encompasses more pixels of the converted image 343 than the first reference image, then the observed state 350 of the operator manipulated input device 60 corresponds to the second position 68.

It should be appreciated that, in some embodiments, the observed state of one of the instruments 44, flight displays 46, and operator manipulated input device 60 may be dependent on one another. For example, the observed state of the instrument 44 depicted in the first region of interest can be dependent upon the flight displays 46 depicted in the second region of interest, the operator manipulated input device 60 depicted in the third region of interest, or both. This advantageously increases the accuracy with which the controller 210 determines the observed state for one of the instruments 44, flight displays 46, and operator manipulated input device 60.

Figure 11:
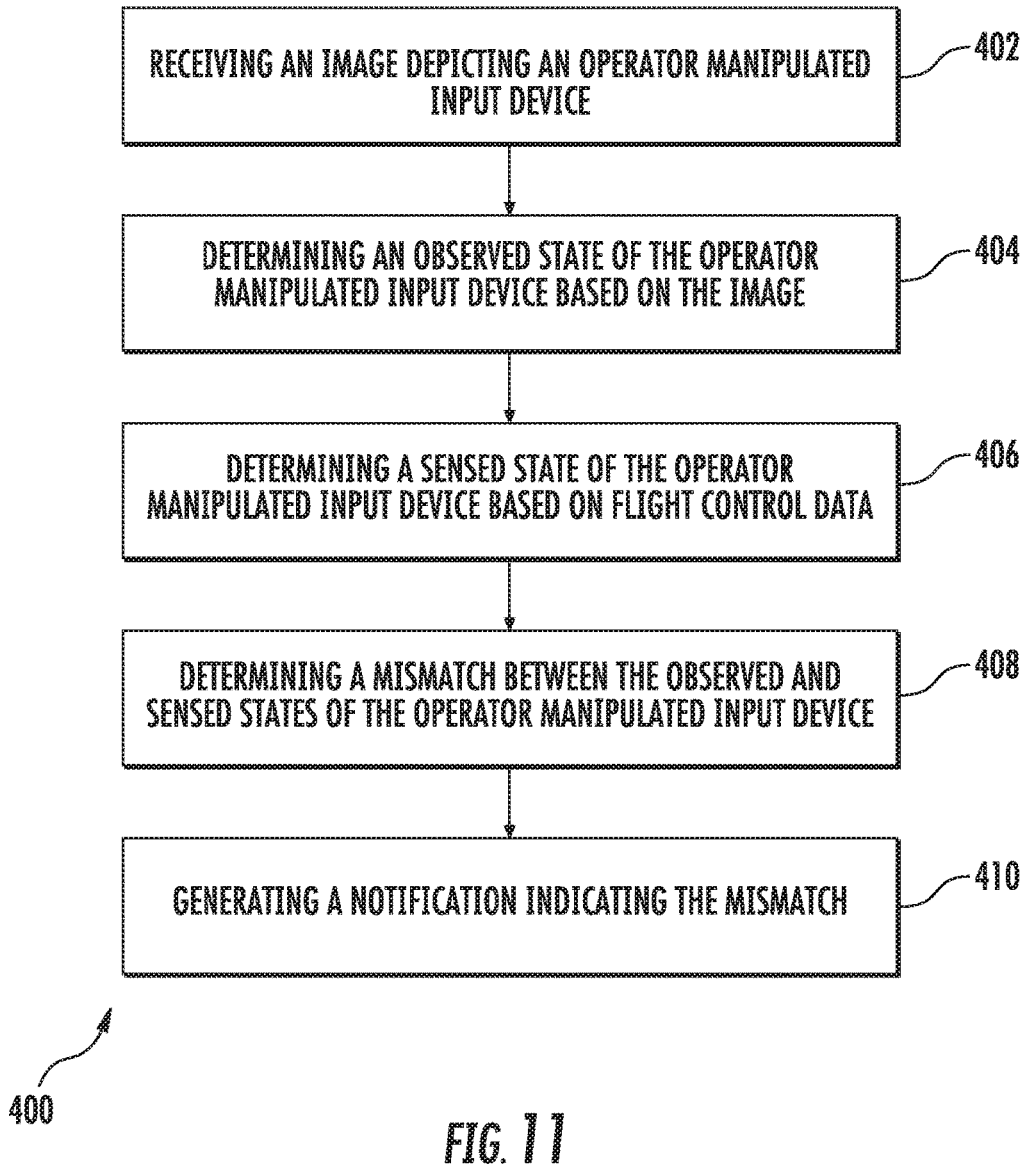
FIG. 11 illustrates a flow diagram of a method for monitoring a cockpit of an aircraft according to example embodiments of the present disclosure.

Referring now to FIG. 11, a flow diagram of one embodiment of a method 400 for monitoring a cockpit 40 of an aircraft 10 is illustrated in accordance with aspects of the present disclosure. In general, the method 400 will be discussed herein with reference to the system(s) 200 described above with reference to FIGS. 1-4. Additionally, even though FIG. 11 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, performed simultaneously, and/or adapted in various ways without deviating from the scope of the present disclosure.

At (402), the method 400 includes receiving, by one or more controllers 210, an image depicting an operator manipulated input device 60 located within the cockpit 40 of the aircraft 10. In one example embodiment, the image is received from the camera(s) 220 positioned within the cockpit 40. Further, the one or more controllers 210 can be configured to process the image using any suitable image processing logic. For example, the one or more controllers 210 can be configured to implement the image processing logic 230 discussed above with reference to FIG. 5.

At (404), the method 400 includes determining, by the one or more controllers 210, an observed state of the operator manipulated input device 60. The one or more controllers 210 can determine the observed state using any suitable pattern recognition algorithm. In one example embodiment, the one or more controllers 210 implement the state detection logic 240 of FIG. 8 in order to determine the observed state of the operator manipulated input device 60. In alternative embodiments, the one or more controllers 210 implement the state detection logic 240 of FIG. 10 in order to determine the observed state of the operator manipulated input device 60.

At (406), the method 400 includes determining, by the one or more controllers 210, a sensed state of the operator manipulated input device 60 based, at least in part, on data received from a sensor of the aircraft 10. In one example embodiment, the data is flight control data 250 received from the flight control system 100 of the aircraft 10. More specifically, the flight control data 250 can be received from the avionics system 120, the sensor system 122, or both.

At (408), the method 400 includes determining, by the one or more controllers 210, a mismatch between the observed and sensed states of the operator manipulated input device 60. More specifically, the one or more controllers 210 compare the observed state determined at (404) to the sensed state determined at (406). If the observed state of the operator manipulated input device 60 is different than the sensed state of the operator manipulated input device 60, then a mismatch exists between the observed and sensed states of the operator manipulated input device 60.

In one example embodiment, the operator manipulated input device 60 is a landing gear lever, and the observed state of the landing gear lever indicates the landing gear lever is in a first position in which a landing gear assembly is generally stowed away within the aircraft 10. In contrast, a sensor operable to detect changes in position of the landing gear lever indicates the landing gear lever is in a second position in which the landing gear assembly is generally deployed. Accordingly, the one or more controllers 210 can determine a mismatch exists between the observed and sensed states of the landing gear lever.

At (410), the one or more controllers 210 can be configured to generate a notification indicating the mismatch. In one example embodiment, the one or more controllers 210 can generate an audible or visual notification indicating the mismatch. More specifically, the audible or visual notification can be communicated within the cockpit 40 to apprise flight crew members of the mismatch. Thus, flight crew members can adjust operation of the aircraft 10 to correct or accommodate for the mismatch.

As an example, if the landing gear assembly does not deploy when a flight crew member moves the landing gear lever from the first position to second position in preparation for landing, the one or more controllers 210 can generate a visual or audible notification within the cockpit 40 to notify the flight crew member(s) of the mismatch.

Figure 12:
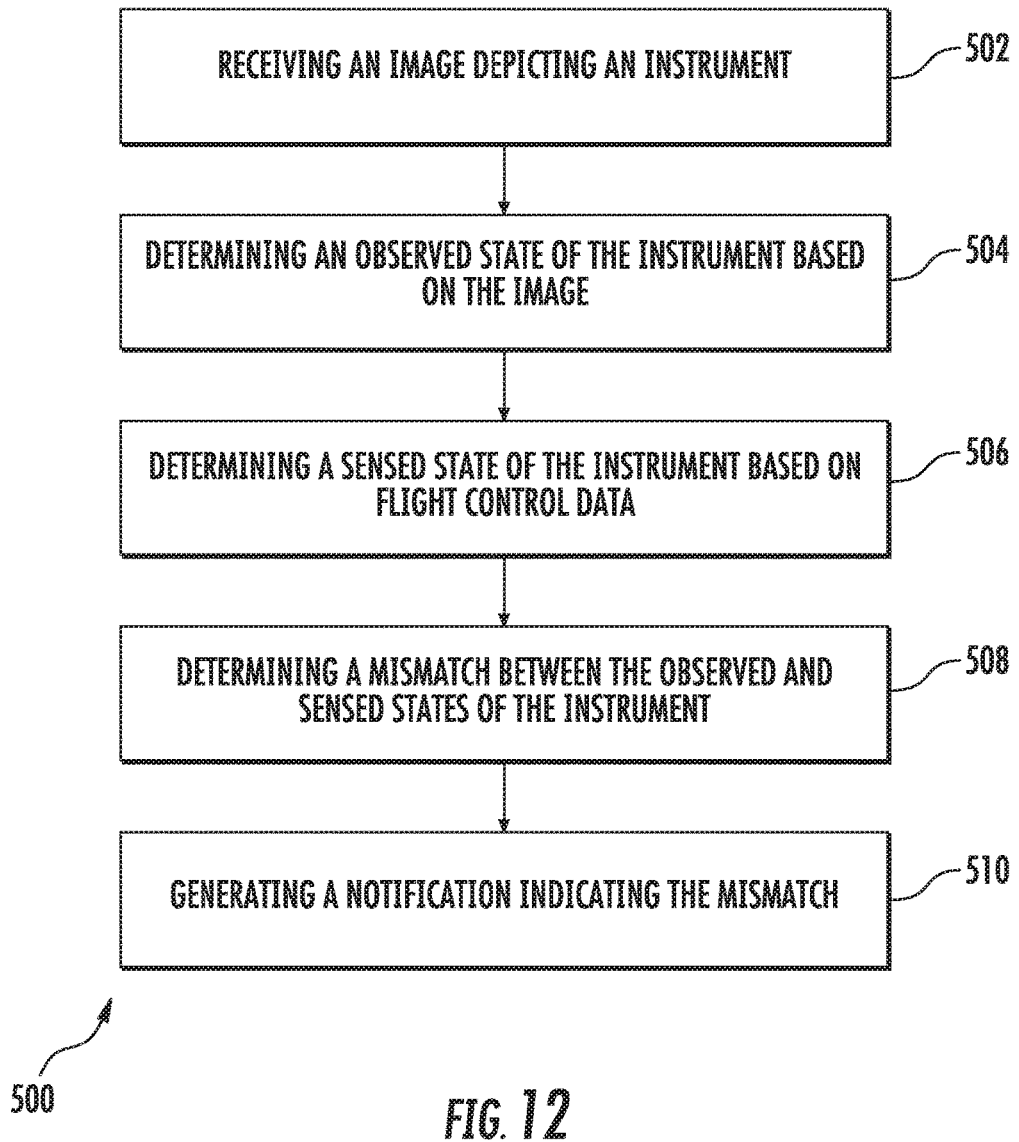
FIG. 12 illustrates a flow diagram of another method for monitoring a cockpit of an aircraft according to example embodiments of the present disclosure.

Referring now to FIG. 12, a flow diagram of another embodiment of a method 500 for monitoring a cockpit 40 of an aircraft 10 is illustrated in accordance with aspects of the present disclosure. In general, the method 500 will be discussed herein with reference to the system 200 described above with reference to FIGS. 1-4. Additionally, even though FIG. 12 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, performed simultaneously, and/or adapted in various ways without deviating from the scope of the present disclosure.

At (502), the method 500 includes receiving, by one or more controllers 210, an image depicting an instrument 44 located within the cockpit 40 of the aircraft 10. In one example embodiment, the image is received from the camera(s) 220 positioned within the cockpit 40. Further, the one or more controllers 210 can be configured to process the image using any suitable image processing logic. For example, the one or more controllers 210 can be configured to implement the image processing logic 230 discussed above with reference to FIG. 5.

At (504), the method 500 includes determining, by the one or more controllers 210, an observed state of the instrument 44. More specifically, the one or more controllers 210 can determine the observed state based, at least in part, on a comparison of the image to two or more reference images depicting the instrument. In one example embodiment, the instrument is a gauge having a needle, and the image received at (502) indicates the needle is in an observed position. The one or more controllers 210 can be configured to determine the observed state of the gauge based, at least in part, on a comparison of the image against first and second reference images depicting the needle in first and second positions, respectively. More specifically, the one or more controllers 210 can compare the observed position to the first position depicted in the first reference image. Further, the one or more controllers 210 can compare the observed position to the second position depicted in the second reference image. If the observed position matches the first position, then the one or more controllers 210 determine the observed state of the gauge, specifically the needle, corresponds to the first position. In contrast, if the observed position matches the second position, then the one or more controllers 210 determine the observed state of the gauge corresponds to the second position. It should be appreciated that the one or more controllers 210 can be configured to compare the image at (502) against any suitable number of reference images.

At (506), the method 500 includes determining, by the one or more controllers 210, a sensed state of the instrument 44 based, at least in part, on data received from a sensor of the aircraft 10. In one example embodiment, the data is flight control data 250 received from the flight control system 100 of the aircraft 10. More specifically, the flight control data 250 can be received from the avionics system 120, the sensor system 122, or both.

At (508), the method 500 includes determining, by the one or more controllers 210, a mismatch between the observed and sensed states of the instrument 44. More specifically, the one or more controllers 210 compare the observed state determined at (504) to the sensed state determined at (506). If the observed state of the instrument 44 is different than the sensed state of the instrument 44, then a mismatch exists between the observed and sensed states of the instrument 44.

At (510), the one or more controllers 210 can be configured to generate a notification indicating the mismatch. In one example embodiment, the one or more controllers 210 can generate an audible or visual notification indicating the mismatch. More specifically, the audible or visual notification can be communicated within the cockpit 40 to apprise flight crew members of the mismatch. Thus, flight crew members can adjust operation of the aircraft 10 to correct or accommodate for the mismatch.

Figure 13:
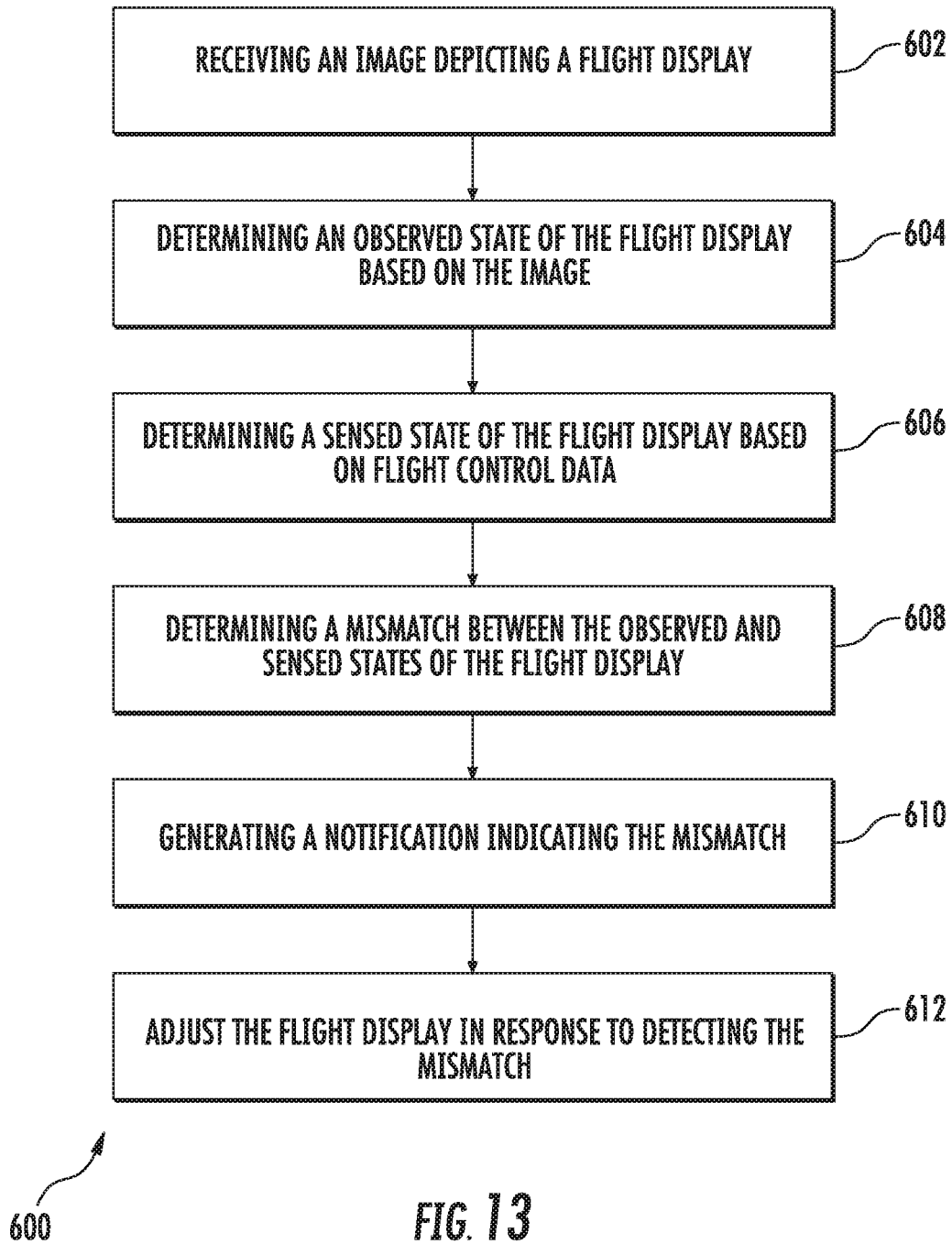
FIG. 13 illustrates a flow diagram of yet another method for monitoring a cockpit of an aircraft according to example embodiments of the present disclosure.

Referring now to FIG. 13, a flow diagram of yet another embodiment of a method 600 for monitoring a cockpit 40 of an aircraft 10 is illustrated in accordance with aspects of the present disclosure. In general, the method 600 will be discussed herein with reference to the system 200 described above with reference to FIGS. 1-4. Additionally, even though FIG. 13 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, performed simultaneously, and/or adapted in various ways without deviating from the scope of the present disclosure.

At (602), the method 600 includes receiving, by one or more controllers 210, an image depicting a flight display 46 located within the cockpit 40 of the aircraft 10. More specifically, the image depicts one or more numerical values presented on the flight display 46. It should be appreciated that the image is received from the camera(s) 220 positioned within the cockpit 40. It should also be appreciated that the one or more controllers 210 can be configured to process the image using any suitable image processing logic. For example, the one or more controllers 210 can be configured to implement the image processing logic 230 discussed above with reference to FIG. 5.

At (604), the method 600 includes determining, by the one or more controllers 210, an observed state of the flight display 46. More specifically, the one or more controllers 210 can determine the observed state using any suitable pattern recognition algorithm. In one embodiment, the one or more controllers 210 implement an optical character recognition (OCR) algorithm to determine the numerical value(s) presented on the flight display 46.

At (606), the method 600 includes determining, by the one or more controllers 210, a sensed state of the flight display 46 based, at least in part, on data received from a sensor of the aircraft 10. In one example embodiment, the data is flight control data 250 received from the flight control system 100 of the aircraft 10. More specifically, the flight control data 250 can be received from the avionics system 120, the sensor system 122, or both.

At (608), the method 600 includes determining, by the one or more controllers 210, a mismatch between the observed and sensed states of the flight display 46. More specifically, the compares the observed state determined at (604) to the sensed state determined at (606). If the observed state (that is, the numerical value) of the flight display 46 is different than the sensed state (that is, the flight control data) of the flight display 46, then a mismatch exists between the observed and sensed states of the flight display 46.

At (610), the one or more controllers 210 can be configured to generate a notification indicating the mismatch. In one example embodiment, the one or more controllers 210 can generate an audible or visual notification indicating the mismatch. More specifically, the audible or visual notification can be communicated within the cockpit 40 to apprise flight crew members of the mismatch. Thus, flight crew members can adjust operation of the aircraft 10 to correct or accommodate for the mismatch.

At (612), the one or more controllers 210 can adjust the flight display 46 to resolve the mismatch determined at (610). In one example embodiment, the one or more controllers 210 can reconfigure the flight display 46 to present information presented on an adjacent flight display. In other words, information presented on another flight display can be duplicated on the flight display 46. This maintains consistency among the information presented on the flight displays 46.

Although the present disclosure has been limited to application on an aircraft, it should be appreciated that the systems and methods described herein are applicable to monitoring the cockpit of any suitable vehicle. For example, the systems and method may be used to monitor the cockpit of a train or automobile.

This written description uses examples to disclose example embodiments of the present disclosure, including making and using any devices or systems and performing any incorporated methods. The patentable scope of the present disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of monitoring a cockpit of an aircraft, the method comprising: receiving, by one or more controllers, an image depicting an operator manipulated input device located within the cockpit; determining, by the one or more controllers, an observed state of the operator manipulated input device based on the image; determining, by the one or more controllers, a sensed state of the operator manipulated input device based on data from a sensor; determining, by the one or more controllers, a mismatch between the observed and sensed states of the operator manipulated input device; wherein the operator manipulated input device comprises a throttle input device operable to adjust engine power of a gas turbine engine of the aircraft; and wherein determining the observed state of the operator manipulated input device comprises: converting, by the one or more controllers, the image to a commission on illumination (CIE) Lab color space; and comparing the one or more controllers, the converted image against at least a first reference image and a second reference image, wherein the first reference image depicts the operator manipulated input device at a first position, and wherein the second reference image depicts the operator manipulated input device at a second position.

2. The method of claim 1, further comprising generating, by the one or more controllers, a notification indicating the mismatch, the notification comprising an audible or visual notification.

3. The method of claim 1, wherein the first reference image defines a region indicating location of the operator manipulated input device when in the first position, and wherein the second reference image defines a region indicating location of the operator manipulated input device when in the second position.

4. The method of claim 3, wherein the region defined by the first reference image encompasses a first set of pixels, wherein the region defined by the second reference image encompasses a second set of pixels, and wherein the first set of pixels is different than the second set of pixels.

5. The method of claim 1, wherein determining the observed state of the operator manipulated input device comprises:
converting, by the one or more controllers, the image to a grayscale image;
applying, by the one or more controllers, a threshold to each pixel of the grayscale image to obtain a binary image; and
comparing, by the one or more controllers, the binary image against at least a first reference image and a second reference image.

6. The method of claim 5, wherein the binary image, first reference image, and second reference image each depict a pattern that identifies the operator manipulated input device.

7. A method of monitoring a cockpit of an aircraft, the method comprising:
receiving, by one or more controllers, an image depicting an instrument within the cockpit;
determining, by the one or more controllers, an observed state of the instrument based on the image;
determining, by the one or more controllers, a sensed state of the instrument based on data from a sensor;
determining, by the one or more controllers, a mismatch between the observed and sensed states of the instrument; and
adjusting operation of the aircraft to correct for the mismatch;
wherein the instrument comprises a gauge having a needle that is movable between a first position and a second position.

8. The method of claim 7, further comprising generating, by the one or more controllers, a notification indicating the mismatch, the notification comprising an audible or visual notification.

9. The method of claim 7, wherein determining the observed state of the instrument comprises determining, by the one or more controllers, a position of the needle depicted in the image.

10. The method of claim 9, wherein determining the position of the needle comprises comparing, by the one or more controllers, the position of the needle in the image against at least a first reference image and a second reference image, the first reference image depicting the needle in the first position, the second reference image depicting the needle in the second position.

11. A system for monitoring a cockpit of an aircraft, the system comprising: a camera positioned within the cockpit; a flight deck disposed within the cockpit, the flight deck comprising a flight display; and a controller in communication with the camera, the controller configured to: receive an image from the camera, the image depicting the flight display; determine an observed state of the flight display based on the image; determine a sensed state of the flight display based on data from a sensor; and determine a mismatch between the observed and sensed states of the flight display; wherein the controller determines the observed state of the flight display by: converting the image to a commission on illumination (CIE) Lab color space; and comparing the converted image against at least a first reference image and a second reference image, wherein the first reference image depicts the operator manipulated input device at a first position, and wherein the second reference image depicts the operator manipulated input device aa second position.

12. The system of claim 11, wherein the controller is further configured to generate a notification indicating mismatch, the notification comprising an audible or visual notification.

13. The, system of claim 11, wherein the system further comprises an operator manipulated input device positioned within the cockpit, wherein the image further depicts the operator manipulated input device, and wherein the controller is further configured to:
  determine an observed state of the operator manipulated input device based on the image;
  determine a sensed state of the operator manipulated input device based on data from the sensor associated with the aircraft; and
  determine a mismatch between the observed and sensed states of the operator manipulated input device.

14. The system of claim 13, wherein the flight deck further comprises an instrument, wherein the image further depicts the instrument, and wherein the controller is further configured to:
  determine an observed state of the instrument based on the image;
  determine a sensed state of the instrument based on data from a sensor associated with the operator manipulated input device; and
  determine a mismatch between the observed and sensed states of the instrument.

15. The system of claim 11, wherein the observed state of the flight display corresponds to a numerical value displayed on the flight display.

16. The system of claim 11, wherein the controller is further configured to populate the flight display with information from another flight display when the mismatch exists between the observed and sensed states of the flight display.

* * * * *